(12) United States Patent
Hing

(10) Patent No.: US 7,839,450 B2
(45) Date of Patent: Nov. 23, 2010

(54) IMAGE SENSOR DEVICE, APPARATUS AND METHOD FOR OPTICAL MEASUREMENTS

(75) Inventor: Paul Anthony Hing, Owingen (DE)

(73) Assignee: Sensovation AG, Stockach (DE)

(*) Notice: Subject to any disclaimer, the term of this patent is extended or adjusted under 35 U.S.C. 154(b) by 2004 days.

(21) Appl. No.: 10/380,570

(22) PCT Filed: Sep. 24, 2001

(86) PCT No.: PCT/EP01/11027
§ 371 (c)(1),
(2), (4) Date: Jul. 28, 2003

(87) PCT Pub. No.: WO02/25934
PCT Pub. Date: Mar. 28, 2002

(65) Prior Publication Data
US 2004/0027462 A1  Feb. 12, 2004

(30) Foreign Application Priority Data
Sep. 25, 2000  (DE) ............................... 100 47 299

(51) Int. Cl.
G05B 15/00 (2006.01)
G05B 19/00 (2006.01)
H04N 5/235 (2006.01)
H04N 5/225 (2006.01)
G03B 7/00 (2006.01)

(52) U.S. Cl. ............... 348/373; 348/229.1; 348/362; 700/259

(58) Field of Classification Search ............ 348/79–80, 348/211.4, 211.5, 211.6, 229.1, 230.1, 240.99, 348/240.1, 240.2, 240.3, 296, 297, 312, 362–8, 348/373–6; 700/259
See application file for complete search history.

(56) References Cited

U.S. PATENT DOCUMENTS

| | | | |
|---|---|---|---|
| 4,587,563 A * | 5/1986 | Bendell et al. ............ 348/244 |
| 5,742,659 A | 4/1998 | Atac et al. | |
| 5,872,596 A | 2/1999 | Yanai et al. | |
| 6,069,377 A | 5/2000 | Prentice et al. | |
| 6,282,462 B1 * | 8/2001 | Hopkins ................. 700/259 |
| 6,977,685 B1 * | 12/2005 | Acosta-Serafini et al. ... 348/308 |
| 7,268,809 B2 * | 9/2007 | Wong et al. ............. 348/231.7 |
| 2002/0186302 A1 * | 12/2002 | Pulkinnen ............. 348/207.99 |

FOREIGN PATENT DOCUMENTS

| | | |
|---|---|---|
| EP | 0 675 345 A2 | 10/1995 |
| EP | 0 918 434 A2 | 5/1999 |
| EP | 1 037 458 A1 | 9/2000 |
| WO | WO 99/48281 | 9/1999 |

OTHER PUBLICATIONS

International Search Report for International Application No. PCT/EP 01/11027.

* cited by examiner

Primary Examiner—Sinh Tran
Assistant Examiner—Daniel M Pasiewicz
(74) Attorney, Agent, or Firm—Husch Blackwell LLP Welsh Katz

(57) ABSTRACT

The invention relates to an apparatus and processes for optical measurement and detection with real-time closed-loop controls, which enable higher levels of performance. The invention is especially suitable for applications such as spectroscopy; microscopy; biochemical assays; processes and reactions on miniaturized formats (such as those involving micro-/nano-plates, micro-formats & micro-arrays, chemistry-on-chip, lab-on-chip, micro-channels and micro-fluidics, where dimensions are on micron scale and columns are in the sub-nanoliter range). Such "intelligent sensing" allows higher data quality and reliability, higher measurement and analysis throughput and lower cost. The invention uses fast real-time adaptive digital signal processing and controls directly at the point where data is sensed. Through real-time adaptive control of sensors, chemical/opto-mechanical/opto-electronic processes and other components during the measurement process, consistently higher quality results and higher reliability are achieved. This invention furthermore includes an improved image sensor architecture that enables very intra-array dynamic range at fast frame rates and low noise performance.

2 Claims, 5 Drawing Sheets

IMAGE SENSOR DEVICE, APPARATUS AND METHOD FOR OPTICAL MEASUREMENTS

Figure 1:
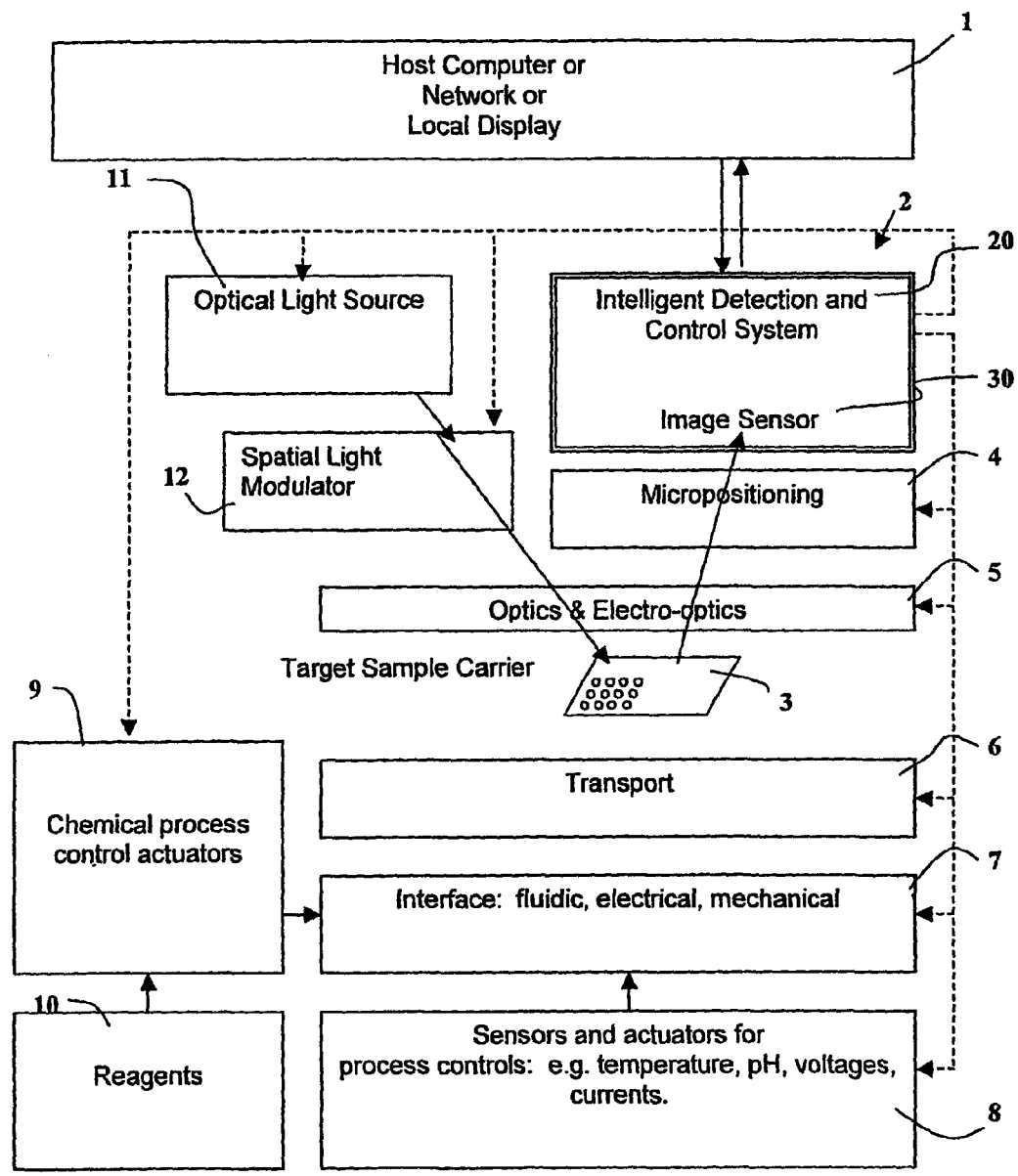

This invention relates to an image sensor device, an apparatus and a method for optical measurements, in particular for optimizing optical measurements through real-time closed-loop control.

Current biotechnology instrumentation: Imaging and spectroscopy is most commonly used in applications such as microscopy; readers for microplates, gel plate electrophoresis, microscope slides and chips; and capillary electrophoresis. Typically the biochemical process is monitored or a result is detected by optical measurement, primarily using fluorescence spectroscopy or chemiluminescence. Common detectors are Cooled scientific CCD and CID cameras, or Photomultiplier Tubes (PMT's).

The most common format for automating biochemistry reactions and assays is the microtiterplate, which provide 96, 384, and recently over one thousand locations (vials or wells) for holding samples or reagents. The dimensions of these plates are on a macro scale of centimeters (approx. 12 cm×8 cm), and reagent volumes in the microliter range. Cameras, or PMT with fiber optic or scanning laser designs are typically used for detection. Microscopy cameras are intended for mounting onto standard microscopes, with connection to a computer. For spectroscopic measurements, optical filters are typically used. Capillary and gel electrophoresis commonly use laser-induced fluorescence or radioactive labeling of molecules, the former using either CCD cameras together with spectrographs or PMT's with optical filters. The target units (samples) to be simultaneously measured currently number up to 96, and can have spacing of close to 100 microns. There are 2-dimensional capillary array designs of similar spacings in the literature. New miniature formats for higher throughput such as nano-plates, BioChips & Arrays, Chemistry-on-a-chip are now emerging. To analyze these, "biochip readers" are available which image the biochip with either scanning lasers and PMT's or cooled scientific CCD cameras.

In general, current instrumentation uses one-time factory alignment and calibration, since mechanical tolerances are acceptable (examples are focusing of optics, spatial location of images, spectral calibration). The sensor or camera has pre-defined operating settings, which it uses to acquire and transmit raw data (most commonly in the form of images) to a host computer. This host then has the opportunity to process the data and perform controls of the process. Most instruments however do not use adaptive real-time controls for performing detection. If it is done, the reaction times are slow because of communication loops, data volumes, and other tasks.

The disadvantage of the current instrumentation is that they do not have capability to rapidly adapt (in real-time) to changes that are sensed, and to perform closed loop control based on this information. They therefore have non-optimal performance, notably limited operating range, non-optimum reaction times, and performance which degrades with time. High throughput, micron-scale dimensions pose alignment problems. As the density and amount of samples increase, dimensions decrease (e.g. micron-scale biochips), and cost reduction is demanded, the existing designs are not well suited.

Systems based on individual sensors or small arrays such as Photodiodes, Avalanche Photodiodes and PMTs have the inherent disadvantage of lower throughput when compared to large array sensors which afford more parallelism.

Scientific CCD Devices and cameras: Used for imaging microplates and biochips. The major advantages of these devices are low readout noise and low dark current when cooled (enabling long exposure times). Scientific devices allow "on-chip pixel binning", which enables virtually noiseless summation. "Back-thinned" or "Back-illuminated" devices with high quantum efficiency are available. The main disadvantages are high cost, slow speed serial readout (no random pixel access). The charge binning capability has been used in biotechnology to achieve higher signal levels at low noise, to decrease data rate output of the sensor, to provide programmable detection of wavelength bands (in spectroscopic applications). Multiple reading of the charge packet from a pixel is a technique used in so-called "skipper CCD's" in the astronomy field to reduce read noise.

Scientific CID Devices and cameras: Used in scientific imaging and spectroscopy applications. The major advantage of these devices is the ability to perform non-destructive pixel reading, and random access to pixels, reportedly allowing dynamic range up to $\sim 10^9$. The main disadvantages are high cost, slow speed of the random accessing. This feature of CID devices has been used in biotechnology to achieve high dynamic range, limited however in speed.

Video rate CCD Devices and cameras: These devices and cameras are commonly used for machine vision applications. Most are designed for video standards, and are not suitable for analytical measurements. Progressive scan devices are most suitable for measurement applications, and are commonly used in imaging applications such as microscopy, particularly when cooled. General advantages are fast speed, electronic shuttering, high resolution, low cost. Disadvantages are high noise, low dynamic range, limited or no pixel binning, higher defect rates.

CMOS Image Sensors: Current devices are targeting consumer/commercial imaging, and have integrated logic functionality and architecture which restrict the control of the sensor. Disadvantages are high noise, low dynamic range, fixed readout timing, higher defect rates. However, their positive features are low cost, high integration, and improving performance as the technology develops. CMOS sensors can also provide similar advantages as CID devices, namely non-destructive pixel reading, and random access to pixels, allowing dynamic range up to $\sim 10^9$. Chemistry has been performed directly on the surface of a CMOS sensor array, thereby using the device as a disposable.

Intelligent Cameras: In the machine vision field, there exist cameras with integrated data processors. These commonly are video cameras and are not suitable for analytical needs of biotechnology. Typically the data processing functions and possibilities for adaptive real-time control of the sensor are fixed or limited.

Current state-of-the-art cameras and detection systems are generally limited by the following disadvantages:

The architectures of current image sensors limit performance since the ability to control them is limited. For example, the ability to define the "readout pattern" (sequence in which data is read from the sensor), or to perform on-chip pixel binning, is limited.

The current cameras and measurement systems are not designed for flexible and programmable real-time control of the image sensor, nor of external components.

The ability to continuously adapt measurement parameters according to variations during the measurement is lacking. This implies that the ability to compensate continuously for sensor defects and response variances, environmental and process condition changes, as well as to optimize the quality and reliability of measurements is limited.

The achievable dynamic range is limited by the sensor. This implies that data can be lost when it is outside this range, leading to unreliability. In the case of CID sensors, which have a possibility to enhance dynamic range, the slow speed at which this can be done is not useful for modem high-throughput applications.

The current cameras and detection systems are designed for specific applications, and are therefore limited in their application. For example, Image sensors and cameras for Imaging, video, photography, security.

The current detection systems are typically one-time factory calibrated and adjusted in production. Because of this, they are not suitable for miniaturized applications with dimensions in the 1-100 micron range, since tolerances are too high. Such production calibration is costly, and leads to steadily decreasing performance with variances, and over time as the system ages.

Existing equipment are not suitable for "distributed/remote/field" networks, since they are too large, expensive, difficult to use, and deliver volumes and rates of raw data which cannot be practically communicated over distributed networks such as the Internet. As an example, they are not suitable as affordable Internet-based "Point-Of-Care" diagnostic instruments.

Single sensors and those available in arrays of a limited number of sensors have the inherent disadvantage of lower throughput (number and speed of parallel measurements). For example, PMT and APD-based systems are limited in practice by the cost necessary to achieve high throughput.

Image sensors such as CCD and CID must be tightly specified to ensure consistent measurement quality. Existing solutions have limited capability to compensate for response defects and variations of these sensors.

The object of the present invention is to provide an image sensor device, an apparatus and a method for optical measurements, in particular for optimizing optical measurements through real-time closed-loop control. The object of the present invention is to solve one or several of the above problems.

This object is solved with the features of the claims.

The advantages of this invention over previous approaches are as follows:

Low cost Use of low cost DSP hardware data processing, low cost/high performance RISC micro-controllers is possible. De-centralized (distributed) processing directly at the sensor lowers cost of the total system can be performed. Adaptiveness enables use of low-cost parts such as CMOS image sensors, plastic disposable sample carriers, by compensating for their weaknesses. Real-time auto-calibration saves manufacturing cost. The higher throughput (samples processed per time) and the miniaturization that it enables reduces cost per test.

Handling of micron-scale dimensions and sub-nanoliter sample volumes: Real-time, high-speed automatic micro-positioning, alignment and focusing, sample location, process control and optimization of detection is achieved. Furthermore, the apparatus can make use of calibration data which is available (readable in real-time) from the target object itself to compensate for wide variations in the production of the said target object. Such data can be stored in microchips embedded in the target object, or otherwise encoded in readable form such as barcodes. This results in cost savings, and enables the use of inexpensive plastic disposable parts.

Designed for high throughput applications: Increased number and density of samples with high processing rates can be processed. Data generated by high resolution image sensors is immediately processed, optimized and reduced, including data reduction through the use of real-time sensor control (such as pixel binning, fast skipping to regions-of-interest).

Higher dynamic range: Achieved through high speed adaptive sensor control. During the acquisition time required by the application, the intelligent detector can continuously monitor individual pixels or subareas, while optimizing parameters such as integration time, illumination, etc. in order to maximize dynamic range and sensitivity. Multiple reading of pixels or areas of high illumination can occur. This implies that the intelligent detector is capable of performing multiple acquisitions and corresponding processing algorithm fast enough to be effective and useful for the application.

A novel image sensor design (referred to herein as "PAF image sensor") described in this invention allows further improvement: The automatic Pixel-Almost-Full (PAF) monitoring is integrated on-chip, in a modularly segmented architecture which yields the necessary speeds to be useful. Intra-array (sample-to-sample or pixel-to-pixel) dynamic range of up to $10^6$ can be achieved, in a time frame of one second.

More tolerance to variations (chemistry, environmental conditions, etc.): Robustness and repeatability is a requirement for commercial products. This is solved by real-time adaptiveness, self-calibration using intelligent algorithms, and real-time data normalization which eliminates all fixed characteristics of the individual system. In addition, a wider range of sensor defects and response variances can be tolerated, resulting in cost savings.

Maintain high sensitivity, despite higher speeds and smaller sample volumes: Real-time adaptive control allows optimization of sensitivity, for example by automatically adjusting the biochemical reaction process, opto-mechanical alignment, exposure time and other acquisition parameters. To maintain high speeds at the same time, parallelization is employed—At the sensor level, segmented (modularized) sensors with multiple outputs such that A/D conversions and analog circuits operate at lower speeds.

"Sample-Based Detection"

This invention allows the apparatus to be programmed, controlled and optimised by the user on a "sample basis"—to think and to optimise the system in terms of the application's goal for each and every individual sample to be measured—i.e., achieving best and most reliable sample analysis results. Furthermore, the said optimisation occurs in real-time closed-loop fashion. This is a systems-based approach, in which the invention goes beyond generating images and delivering pixel values. For example, in spectroscopy applications, the system can be programmed to optimise the spectral binning vs. sensitivity on an individual sample-by-sample basis.

Designed as an embedded system (does not require a specific type of host computer), or for autonomous operation Ease of embedding (interfacing) to any host computer, including other embedded systems via industry standard communications. Once programmed, the intelligent detector can operate autonomously.

Internet-ready appliances and instrumentation

This invention enables "remote networking", "distributed networking", of "internet-capable appliances or instruments", since the concept is to reduce and analyze data directly at the sensor. The analysis results can be communicated via internet since its quantity is small and information content (quality) is maximized. The cost reduction achieved through a higher level of integration, reduction of interfaces, and elimination of post-processing computers is important commercial factor. In the healthcare industry of the future, this is useful in "Point-Of-Care" diagnostic instruments, or for field-analysis of biological samples (e.g. the analysis of tissue immediately where it is obtained).

Figure 2:
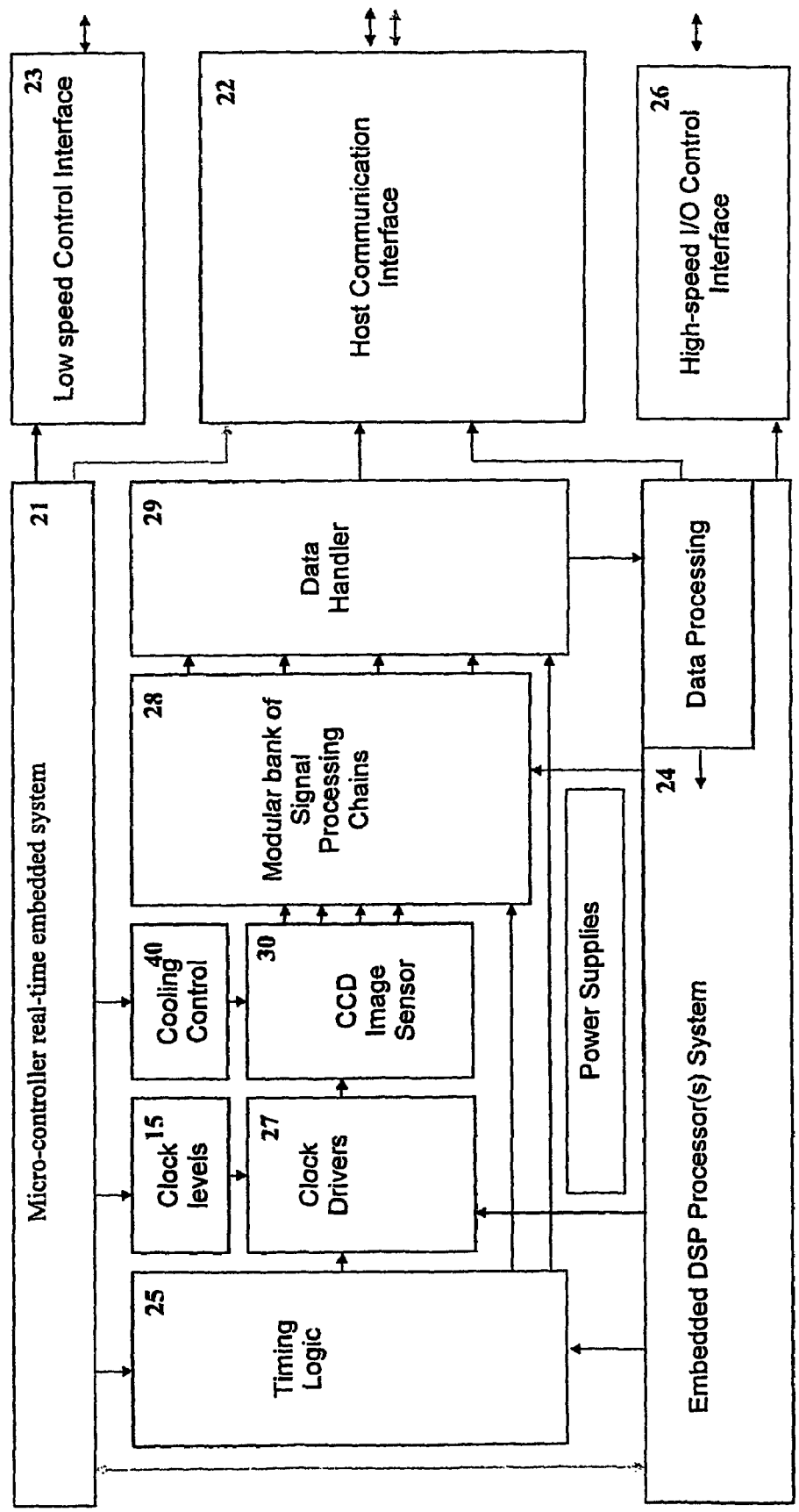
Figure 3:
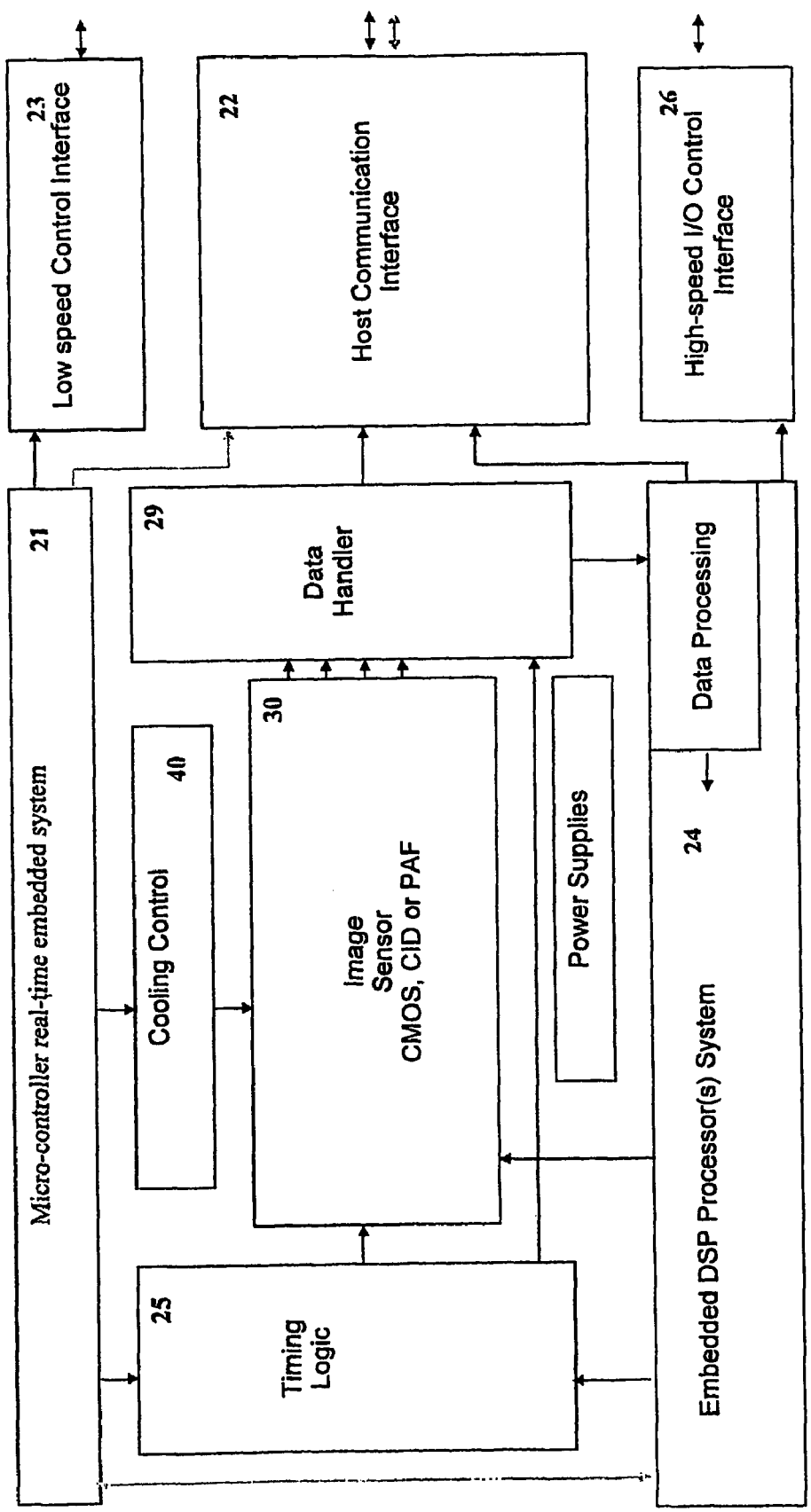
Figure 4:
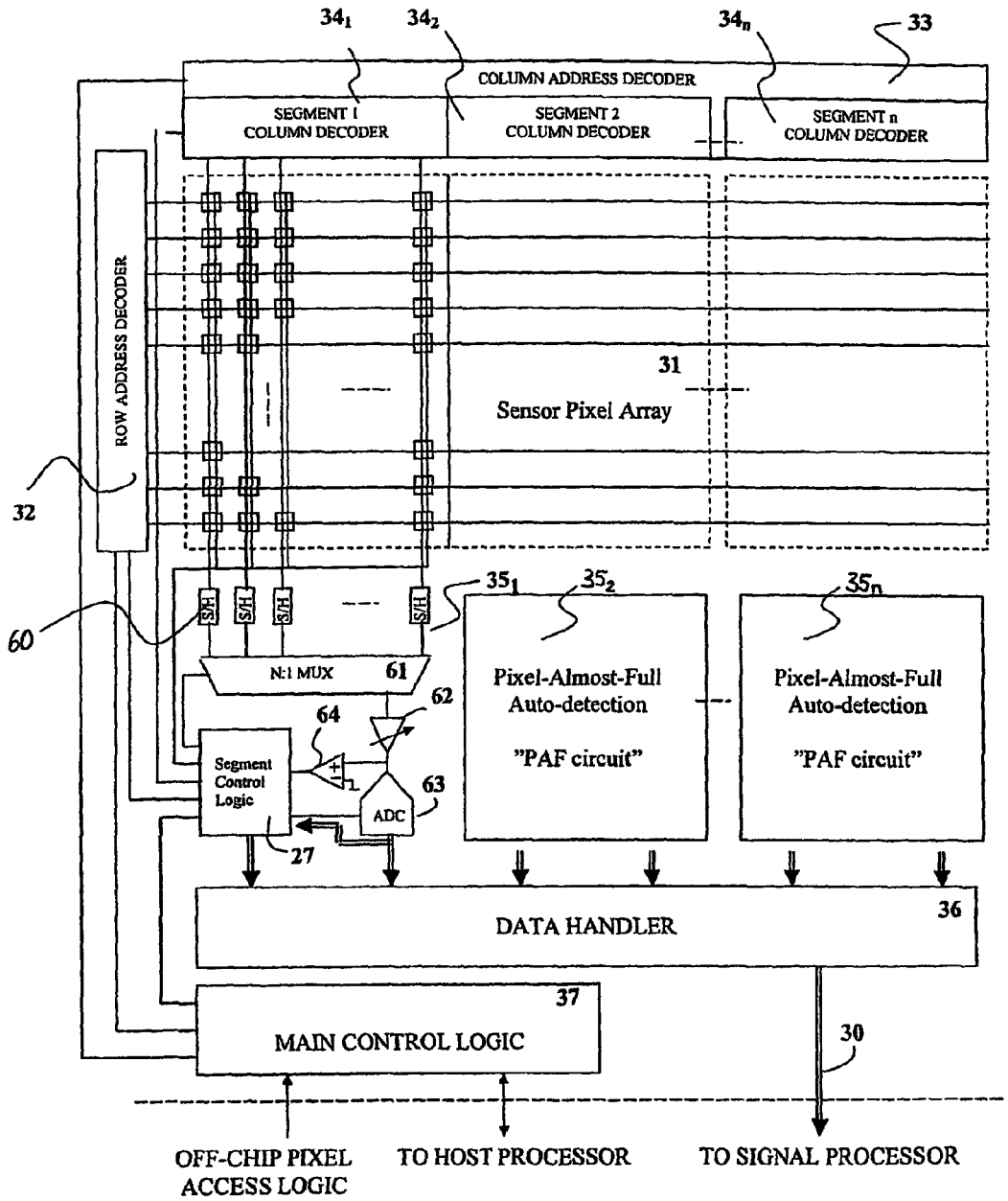
Figure 5:
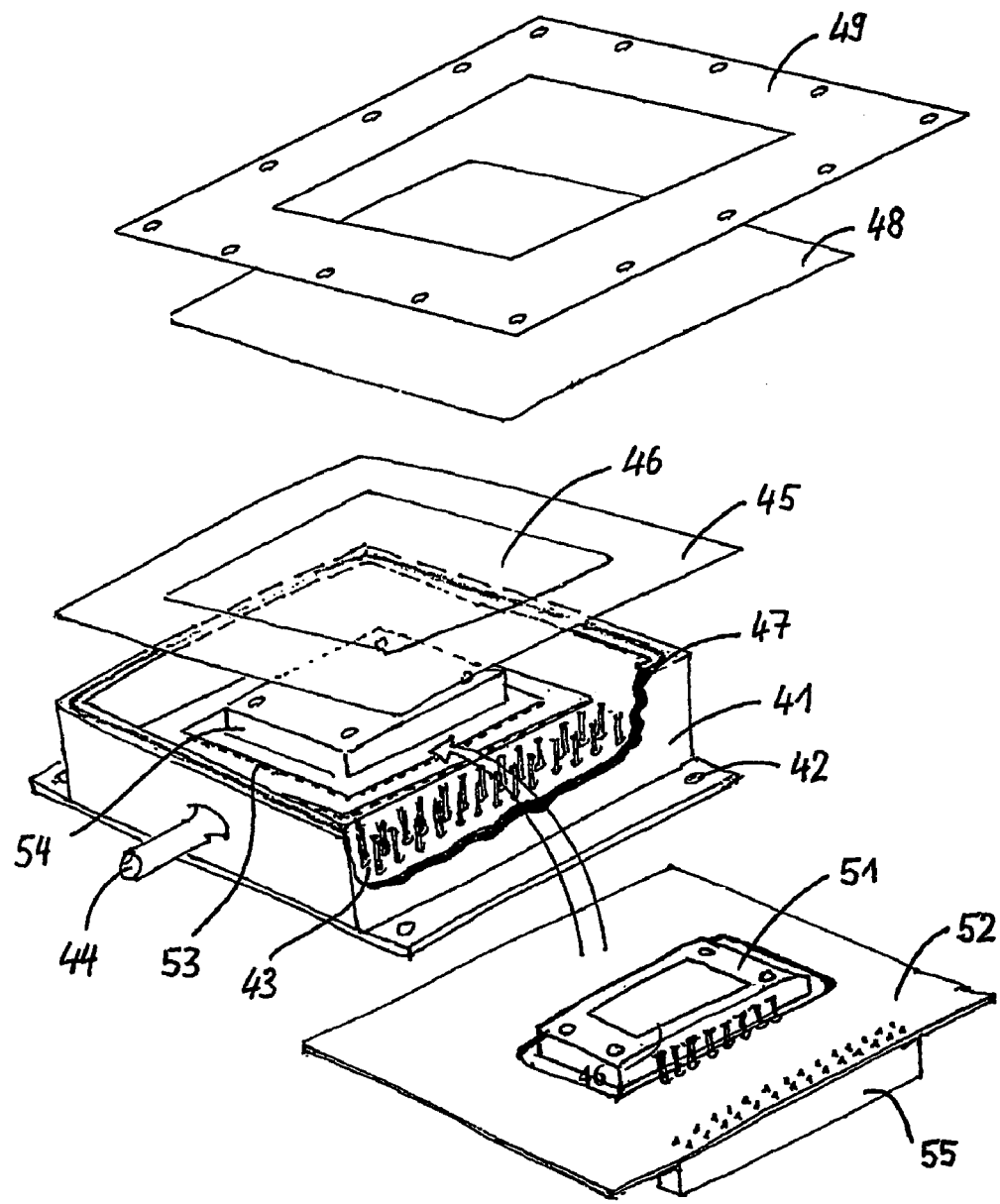

The present invention can be used in a number of target markets including, but not limited to:
Biotechnology Instrumentation
Pharmaceutical (Drug discovery, High Throughput Screening)
Clinical lab automation
Medical Diagnostics, Medical Instruments, Telemedicine
Agriculture
Animal husbandry
Environmental Monitoring and Controls
Law enforcement, Human Identification, Forensics The invention will now be described with reference to preferred embodiments and the drawings, in which:

FIG. 1 is a diagram of a system according to this invention, in particular illustrating how the apparatus is positioned and used in a typical micro-format application, FIG. 2 illustrates a first preferred embodiment of an apparatus according to this invention for CCD image sensors, FIG. 3 illustrates a second preferred embodiment of an apparatus according to this invention for CMOS, CID and PAF image sensors, FIG. 4 shows a diagram of the general architecture of the preferred embodiment of the PAF image sensor, and FIG. 5 shows a preferred embodiment of a cooling package which can be used for cooling an apparatus shown in any of FIGS. 2 to 4.

The present invention provides an intelligent detector:

The present invention particularly provides an apparatus comprising of electro-optics, electronics, firmware and software and processes which enables higher levels of optimization for optical measurements. Achieving higher performance and reliability is enabled for applications such as Image Processing, Spectroscopy, Microscopy, Chemical and biochemical process controls. The said apparatus is especially suitable for assays, processes and reactions in miniaturized formats with dimensions in the micron scale and sample volumes in sub-nanoliter scale. Furthermore, the apparatus has a high level of integration, compactness and Internet-capability, and can operate independent of host computers (PCs).

The said apparatus allows fast closed-loop digital control of image sensor(s) and any or all chemical, mechanical, optomechanical and opto-electronic components and processes which may affect the signals to be optimized. This is achieved by programmable high-speed processing (for example using real-time embedded microcontroller, hardware signal processing logic and/or DSP systems) employed directly at the image sensor. Sensor output data is immediately processed and evaluated. Furthermore, the processor has direct control of image sensor parameters (such as integration time, pixel binning, readout pattern, etc) via direct interface (bus or I/O) to digital logic which drives the sensor, as well as direct I/O control of any external parameters (dashed lines in FIG. 1).

When said apparatus is used with available CCD, CMOS and CID image sensors, performance can be significantly improved, thereby enabling applications that were not previously possible. Furthermore, an improved sensor architecture (hereto referred to as "PAF Image Sensor"), which enables fast frame rates, low noise, and very high intra-array dynamic range is a part of this invention. The programmability of said apparatus provides the platform for the development of application-specific control and data-processing algorithms (intellectual property), for example for biotechnology assays.

A diagram of a system according to this invention, in particular how the apparatus is positioned and used in a typical micro-format application is illustrated in FIG. 1.

Referring to FIG. 1, the system comprises a host computer and/or network and/or local display 1, which is connected via a bus to an apparatus 2, which comprises an intelligent detection and control system 20 and an image sensor 30. The dashed lines and arrows indicate capability of high speed real-time adaptive control of other parts of the system, which will be described hereunder. The image sensor(s) 30 is also under the control of said apparatus 2. A target object 3, here portrayed as a Biochip or micro-array, typically has features in the micron range, and may be transported into and out of the system manually or by automated (robotic) transport 6. Said target object may be illuminated and/or excited by optical sources 11, which may be programmable, optionally using programmable spatial light modulation means 12, via an optical system 5, which comprises optics and/or electro-optics. The system further may include means for micropositioning 4 the apparatus with respect to the target object 3. Additionally an interface 7 for fluidic, electrical and/or mechanical interaction may be connected to a system 8 comprising sensors and actuators for process controls, e.g. temperature, pH, voltages and/or currents. The system may further comprise process means 9 comprising chemical process control actuators and a supply means 10 for reagents. Detection (imaging) is performed by said apparatus 2 via said optical system 5. Based upon the data previously acquired, said apparatus 2 can perform real-time adaptive control of all other subsystems which affect the measurement, with the goal of optimizing the result within the time frame required. Said apparatus performs data processing directly at the sensor. Some parameters that can be modified might be (and is not limited to): Mechanical alignment; Focus; Exposure time; Illumination; Voltages and currents; temperature (8); Flow rates of reagents (9); Sensor parameters such as pixel binning, image sensor readout pattern, noise optimization.

The apparatus 2 has the capability of autonomously performing the detection/control task using any desired optimizing method (algorithm), provided that constraints required by the application are met. Said algorithms are fully programmable and can be defined and changed by the host 1 at any time, and are executed at high speed. Within the "measurement time" required by the host, said apparatus is able optimize the system to deliver the highest quality data.

The first preferred embodiment of said apparatus 2 for CCD image sensors 30 is illustrated by FIG. 2. A real-time micro-controller embedded system 21 provides flexibility, programmability, and easy host interface. It handles communications protocols with the host using industry standards via a host communication interface 22, multi-tasking, operation sequences over longer time frames, and slower controls via a low speed control interface 23. This includes Internet protocols and the full implementation of a web server in the said apparatus. Said micro-controller 21 acts as host (master) to optional digital signal processor(s) (DSP) 24 and to optional hardware signal processing (typically implemented in FPGA or ASIC technology) 25. The apparatus enables distributed data processing in three optional stages. Firstly, the said hardware data processing is the fastest, allowing in-line data processing with algorithm times on the order of 1-100 ns. Secondly, the said DSP performs data processing, with high speed real-time feedback control of the CCD image sensor 30, as well as other external actuators and sensors which affect performance via a high-speed I/O control interface 26. Such algorithms execute in the micro-second time frame, and can operate on significant amounts of data. Thirdly, the said micro-controller system 21 can perform data processing algorithms. One or more CCD Image Sensors 30 perform the optical acquisition function, whereby said apparatus accommodates multiple output devices. The operation of said CCD is driven by a bank of clock drivers 27, the number and organization of which is determined by the specific image sensor. Clock voltage levels 15 and optimization for fast or slow clock rates are programmable as is cooling control 40. The clock waveforms and readout mode of said CCD are generated by timing logic 25 (typically implemented in FPGA or ASIC technology).

The readout mode is programmable. The output(s) of said CCD are amplified by a bank of signal processing chains 28, whereby gains can be programmed, and either low noise, high resolution or high speed modules can be used. A Data Handler 29 accepts multiple data streams from said CCD, and ensures high bandwidth interface to said DSP. Said DSP 24 and hardware signal processing 25 perform application-specific data processing, in-line data calibration/normalization/correction (also using pre-stored calibration data), and transmits the resulting high quality, minimized result to a host computer.

The second preferred embodiment of said apparatus for CMOS, CID and PAF image sensors is illustrated by FIG. 3. The description of the parts and their functions which are the same as in FIG. 2 is omitted here. Currently available CMOS and CID image sensors have a high level of integration, with pixel address decoder, driving circuits, readout timing generators, amplifier(s), A/D converters possibly on-chip. Since most are designed for specific modes of operation (e.g. video imaging), their architecture limit flexibility in controlling the operation of the device, which in turn limits the performance that can be achieved. The PAF Image Sensor is a part of this invention which overcomes these limitations. It allows the intelligent detector more control of the sensor, and integrates additional circuitry on-chip in order to achieve high dynamic range at high frame rates.

The image sensor 30 is interfaced to said micro-controller 21, via programmable logic 25 if necessary. Said image sensor delivers digital data, which passes through the high bandwidth DSP interface 29.

The present invention further provides an improved "Pixel-Almost-Full Image Sensor":

An improved architecture for an image sensor which, when used in the said intelligent detector, enables achievement of high intra-array dynamic range at speeds which are enabling to micro-format biotechnology applications. Such speeds are hot otherwise available.

Said PAF Image Sensor (Pixel-Almost-Full; PAF) integrates on-chip Circuitry and Logic for monitoring (via non-destructive reading) of all pixels, detection of pixels which are close to full-well, resetting of these individual pixels as necessary, and output of their location and values. To achieve higher frame rates, the pixel array is modularly segmented, such that each segment is monitored by its own Segment Control Logic and circuitry. On-chip integration of this function alleviates need for off-chip logic or DSP resources. By multiple reading of individual pixels within the exposure time, the apparent capacity of the pixel and hence dynamic range is increased.

In the preferred embodiment, the technology for implementation of said PAF image sensor is CMOS process, for the following reasons:

Allows integration of circuitry;

Low cost, industry standard I.C. technology;

Can be designed for non-destructive reading and random pixel access;

High speed DSP data interface and data processing can be integrated on-chip.

The diagram of the general architecture of the preferred embodiment of the PAF image sensor is shown in FIG. 4.

The PAF image sensor comprises a sensor pixel array 31, a row address decoder 32, a column address decoder 33, PAF circuits $35_1, 35_2, \ldots 35_n$ a data handler 36 and a main control logic 37. The blocks referred to as the "PAF circuit", perform the novel on-chip pixel monitoring. In order to achieve high monitoring rates, the pixel array 31 is modularly segmented into N segments, each with its own PAF circuit. One-dimensional (column) segmentation is shown, wherein the column address decoder 33 comprises segment column decoders $34_1, 34_2, \ldots 34_n$. A 2-dimensional (row and column) can similarly be implemented by segmenting the row and column decoders 32, 33. The level of segmentation can be optimized according to the frame rates required by the intended application. According to the requirements of a host controller, said PAF circuit 35 is responsible for "monitoring" all pixels in said segment. Said PAF circuit comprises a Segment Control Logic block 35, which is under control of the Main Control Logic block 37. Said PAF circuit further comprises sample and hold means 60, N:1 multiplexer 61, a variable amplifier 62, an A/D converter 63 and a comparator 64. Said Segment Control Logic 35 generates the pixel address within the segment, controls resetting of pixels, initiates A/D conversion, and transmits pixel addresses and data to said Data Handler 36. During monitoring of the segment, if the pixel is detected to be at or above the "almost-full" level (either by analog comparison 64, or digital comparison), the pixel address and data from the A/D converter 63 is sent to the Pixel Data Handler 36. The Pixel Data Handler 36 outputs data to a signal processor. The optional programmable gain 62 of the amplifiers can be set by the host. The main control logic 37 can be controlled by off-chip pixel access logic and exchanges data with the host processor.

The device allows external logic to perform random, access to pixels such that individual pixels can be read and/or reset.

This device can be operated in a normal imaging mode, similar to available image sensors by disabling said PAF circuit function.

Thermo-electric cooling and hermetic sealing package for all off-the-shelf image sensors:

In order to decrease cost, the said apparatus accommodates less expensive image sensors, including the PAF image sensor, while compensating for their weaknesses by adapting the entire measurement system to the sensor. As an integral part of this effort, cooling increases device performance, thereby increasing the probability that inexpensive devices will be feasible for biotech applications. A method and apparatus for thermoelectrically cooling and hermetically sealing any image sensor is described. Said cooling apparatus accommodates all available off-the-shelf non-cooled image sensors which are available packaged in standard I.C. packages, including the "novel PAF image sensor", and provides high reliability welded hermetic seal, while allowing an option whereby the imaging device can be easily removed/replaced. The latter is advantageous when the device has high cost relative to other components, or for rapid prototyping.

The preferred embodiment of the cooling package is shown in FIG. 5. A metal housing 41 which is large enough to accommodate available imaging devices together with a lid forms a sealed chamber for the image sensor. Said housing also conducts heat away from the thermoelectric cooler/imaging device. Said housing has a feature 42 (e.g. flanges for screw mounting) which allow clamping with even pressure to a heatsink (not shown). Said housing comprises a connector 43 which allows a multitude of electrical connections via hermetically sealed contacts. Said housing may optionally have a feature 44, for example a port for interface to tubing, which can be hermetically sealed by crimping and/or welding for evacuating and backfilling the chamber with an inert gas. For high reliability ("production") assemblies, a metal lid 45 with integrated optically transparent window 46, e.g. glass or quartz is hermetically welded onto the housing. Said window is hermetically sealed into said lid. Alternatively for "prototyping" or cases in which the device must be removed/replaced, a sealing O-ring or gasket 47 is installed between the lid 45 and the said housing 41. An optically transparent window 48 e.g. glass or quartz is then sealed against said housing, using even pressure of a clamping frame 49. Modules which are Imaging device-specific are then mounted in said housing. Each module consists of the particular imaging device 51, a printed circuit adapter 52, e.g. ceramic substrate, PC board or flex circuit, a thermoelectric cooler 53, and a thermally conductive heat block 54. Said imaging device is installed onto said circuit adapter, which allows pinout mapping, mounting and clamping of said imaging device to the said thermoelectric cooler, heat block and housing, and may include electronic circuitry. Optional use of high reliability connector(s) 55 provide for interchange of modules. The components of this stack are brought into good thermal contact, e.g. through the use of mechanical pressure, thermally conductive glues, epoxies, and/or similar material layers/films. The optical window may be anti-reflection coated on both sides. In order to maximize cooling efficiency, insulating material may be used in the chamber (not shown), and contact to said image device's pins may be achieved through the use of conductive elastomeric connectors 56, which have high thermal resistance. The inside of the chamber is filled with inert gas (e.g. Argon), either via said backfilling port 44, or by assembly in the inert gas atmosphere.

The following definitions are solely given for the purpose of a better understanding of the invention. However, the scope and meaning of the below terms shall not be restricted to these definitions.

| | |
|---|---|
| Adaptive | Able to continuously compensate for changes and variations by modification of parameters and conditions such that a desired goal is achieved. |
| Algorithm | Programmable software method which establishes the functionality of the apparatus in particular applications. |
| Avalanche Photodiode (APD) | Solid-state optical sensor for sensitive measurements based on the principle of multiplication of the detected signal via the avalanche effect in semiconductors. |
| Back-thinned CCD | CCD image sensor which is illuminated from the "back side" in order to achieve high quantum efficiency over a broad wavelength range. |
| Binning, on-chip | The summation of signal charge in analog fashion from a plurality of pixels on the sensor itself. This form of summation does not generate noise, and therefore enhances Signal-to-Noise Ratio. |
| Biochemical assay | A method or procedure used to carry out a biochemical process, analysis, or the like. |
| Biochip | Miniaturized sample carrier format used in laboratory automation to handle, transport and process a plurality of samples, reagents or reactions in parallel. The number of samples on such an array may approach hundreds of thousands. |
| Camera | An image generating apparatus which is based on optical Image Sensors. |
| Charge Coupled Device (CCD) | Semiconductor image sensor which operates on the principle of charge transfer |
| Charge Injection Device (CID) | Semiconductor image sensor which operates on the principle of reading charge from its pixels via charge injection into its substrate. |
| Chemistry-on-Chip | Miniaturized format for carrying out chemical and biochemical processes, analyses, diagnostics and the like. Structures in the 1-100 micron-scale dimensions, reagent volum s below a nano-liter. High throughput, lower cost and higher performance is possible. |
| Clock driver, voltage | Clock drivers provide th voltages and waveforms required by CCD image sensors in order to read the image. These voltage waveforms transfer signal charges in pixels to an output where they are read. |
| CMOS | Semiconductor image sensor which is produced using the Complimentary Metal Oxide Semiconductor process which is very widespread in the semiconductor industry. |
| Correlated Double Sampling (CDS) | Electronic circuit technique used to reduce the noise in electric signal measurements, whereby the signal is sampled and held twice and a difference measurement made. |
| Defects, sensor | |
| Digital Signal Processor (DSP) | Semiconductor digital Integrated Circuit which is optimised for high speed data processing. |
| Dynamic Range | Measurement range from the smallest discernable signal to the largest measurable signal |
| Electrophoresis | An analysis method whereby molecules can be separated according to a property. Commonly molecules are separated by size (length) and correspondingly mobility under an electric field. |
| Fast skipping | The ignoring of pixel values which are not of interest. This is done at higher speeds and/or combined with pixel binning in order to increase acquisition (frame) rate. |
| Field Programmable Gate Array (FPGA) | Programmable semiconductor logic Integrated Circuit which can implement digital circuitry, including complex functions such as digital signal processing. The functionality is re-programmable at any time. |
| Format, micro- or miniaturized- | Sample carrier used in laboratory automation to handle, transport and process a plurality of samples, reagents or reactions in parallel. |
| Intelligent | Applied to a sensing apparatus, intelligence implies the ability to autonomously process information, make decisions and take actions which improve the results achieved. |
| Inter-array dynamic range | The measurement range between the smallest discernable signal in a target field (an array of target units) to the largest signal measurable. |
| Internet capable appliance or instrument | Apparatus which is capable of direct communication of information, and/or can be programmed and controlled via the Internet. |
| Internet communications | The transmission and communication of information over the Internet, including data and controls. |
| Internet Protocols | Industry standard software protocols used for communication on the Internet, e.g. for e-mail, file transferring, messaging, etc. |
| Lab-on-Chip | See Chemistry-on-Chip. |
| Machine Vision | Industrial imaging applications wherein cameras are used in automation and machine control. |
| Measurement system | A system which includes this invention, used for the detection, measurement and analysis of target objects, fields or units. This system includes all components which affect the measurements to be made, including electronics, mechanics, optics, chemical materials and processes, and environmental conditions. |
| Micro-/nano plates, Microtiterplate | Sample carrier format used in laboratory automation to handle, transport and process a plurality of samples, reagents or reactions in parallel. The number of samples on such carriers approach thousands. |
| Micro-array | Miniaturized sample carrier format used in laboratory automation to handle, transport and process a plurality |

-continued

| | |
|---|---|
| | of samples, reagents or reactions in parallel. The number of samples on such an array may approach hundreds of thousands. |
| Microchannels, micro-fluidics | Technology involving the use of miniaturized channels produced via micro-technology and micro-machining. For example used in Lab-on-chip for transporting reagents or samples, electrophoresis, measurement and analysis. |
| Network, remote-, field- or distributed- | Communication, data exchange and control between computers, instruments, appliances and apparati which are distributed in the field (as opposed to centralized in one location). The Internet is an example of such a distributed network. |
| Non-destructive reading | The ability to read (monitor) pixel values during exposure without disturbing or interrupting light collection. |
| Photomultiplier tube (PMT) | Optical sensor based on vacuum tube technology which performs very sensitive optical measurements due to its ability to multiply the detected signal under high electric fields. |
| Pixel | An individual optical sensor unit of an Image Sensor. |
| Point-Of-Care (POC) | Applications of the invention in healthcare, whereby measurement, analysis or diagnoses are carried out at distributed locations in the field as opposed to being centralized in a laboratory. This includes necessary remote networking and communications. |
| Read | When referring to reading of pixels, this is the process of obtaining the information (value) of signals which have been photo-electrically converted by the sensor. The result of reading may be in the form of an analog signal value or a digital number. |
| Readout pattern/mode | The sequence of events by which signals are obtained from an image sensor. Within this sequence, pixels may be read individually, ignored (skipped), pixel groups can be binned on-chip then read as a single signal from the image sensor. |
| Real-time, closed loop feedback control | "Real-time" describes operations (tasks) which are carried out within the duration of the process, measurement or analysis; which occur in a deterministic time, at speeds high enough to achieve set goals within the said duration. Closed loop feedback control is a mechanism by which such a task immediately and continuously adjusts and optimises parameters and conditions which influence the measurements such that a set goal is achieved. |
| RISC | Reduced Instruction Set Machine: A type of processor which operates at high instruction execution speeds, on a smaller, simpler set of instructions. |
| Sample-and-hold | Electronic circuit used in the measurement of an electric signal whereby the signal is sampled and held stable and constant during measurement. |
| Sensor, Image sensor | A sensor is a device capable of generating a signal based on properties of the target unit to be measured. This includes single and array sensors. Image sensor is an array of optical sensors capable of photoelectric conversion. |
| Spatial Light Modulator (SLM) | Device which is capable of programmably modifying the illumination of a field. Typical SLMs are liquid crystals or micro-mirror arrays. |
| Sub-area | A sub-area of an image sensor is a group of pixels. |
| Target field | The maximum spatial extents in which the apparatus can perform detection and measurements. May be 2- or 3-Dimensional. |
| Target object | A single principal object in the measurement field of the apparatus. This can for example be a carrier for an array of samples to be measured. |
| Target unit | A single entity to be detected, measured and analysed. This is for example a sample. |
| Thermo-electric cooler (Peltier cooler) | Solid-state device used for cooling or heating. Electrical input power is converted to a temperature difference. |
| Throughput | Speed of detecting, measuring and/or processing target units. |
| Web server | Internet software resident in an apparatus, which provides an interface to other computers on the Internet. |

The invention claimed is:

1. An apparatus for optical measurements, real-time imaging, sensing, detection, or controlling, comprising:
a single or a plurality of image sensors, said image sensors comprising one or a plurality of image sensor devices;
cooling means for cooling said image sensor devices, said cooling means comprising at least one package in which one or several image sensor devices are thermo-electrically cooled and sealed in a hermetic manner, said package configured to accommodate off-the-shelf non-cooled image sensors packaged in standard I.C. packages, and further allowing for the image sensor device to be removed or replaced;
said at least one package comprising;
a. a metal housing, with hermetically sealed connection pins, wherein one side is open, said housing accepting a metal cover which is welded on, or provides for implementation of an O-ring or gasket seal against a removable cover;
b. a cover, which comprises an optically transparent window hermetically sealed into a metal mounting frame, said cover can be welded against said housing forming a hermetically sealed chamber;
c. a printed circuit board, flex circuit or ceramic adapter for mounting of a single or a plurality of imaging sensor devices, for adapting to the pinout of said imaging sensor devices, and for implementing electronic circuits directly at said imaging sensor devices,
d. a single stage or plurality of stages of thermo-electric cooling elements, and
e. a metal heat transfer block for thermal transfer between said thermo-electric cooling elements and said imaging sensor devices;
digital logic means, to drive said image sensors as well as a direct I/O control;
a processor mechanism for performing high-speed closed-loop digital control of said image sensors, the processor mechanism performing high-speed real-time control of image sensor parameters via direct interface to said digital logic means; and
at least one signal optimization system, comprising at least one of a chemical, mechanical, opto-mechanical or opto-electronic component or process which affect any signals to be optimized, said digital logic means to drive at least one of said chemical, mechanical, opto-mechanical and opto-electronic components and processes;
wherein said processor mechanism is placed directly at said image sensor such that output data from said image sensor is immediately processed and evaluated.

2. The apparatus according to claim 1, further comprising an optically transparent window which seals against said housing via an O-ring or gasket, and is clamped via pressure means, wherein said window can be removed allowing to remove or to replace one or several image sensor devices.

* * * * *

UNITED STATES PATENT AND TRADEMARK OFFICE
CERTIFICATE OF CORRECTION

| | | |
|---|---|---|
| PATENT NO. | : 7,839,450 B2 | Page 1 of 1 |
| APPLICATION NO. | : 10/380570 | |
| DATED | : November 23, 2010 | |
| INVENTOR(S) | : Paul Anthony Hing | |

It is certified that error appears in the above-identified patent and that said Letters Patent is hereby corrected as shown below:

Column 7, line 55, before the word 'otherwise', delete "hot" and add --not--.

Column 10, line 14, after the word 'reagent', delete "volum s" and add --volumes--.

Signed and Sealed this
Eighth Day of February, 2011

David J. Kappos
*Director of the United States Patent and Trademark Office*